Feb. 8, 1966  C. A. WIKEN  3,233,826
VOTING MACHINE
Filed June 5, 1964  13 Sheets-Sheet 4

INVENTOR.
CHRISTY A. WIKEN
BY
Bean, Brooks, Buckley & Bean.
ATTORNEYS Feb. 8, 1966   C. A. WIKEN   3,233,826
VOTING MACHINE
Filed June 5, 1964   13 Sheets-Sheet 5

INVENTOR.
CHRISTY A. WIKEN
BY
Bean, Brooks, Buckley & Bean
ATTORNEYS

Feb. 8, 1966          C. A. WIKEN          3,233,826
VOTING MACHINE Filed June 5, 1964          13 Sheets-Sheet 8

INVENTOR.
CHRISTY A. WIKEN
BY
*Bean, Brooks, Buckley & Bean*
ATTORNEYS

Feb. 8, 1966  C. A. WIKEN  3,233,826
VOTING MACHINE
Filed June 5, 1964  13 Sheets-Sheet 11

INVENTOR.
CHRISTY A. WIKEN
BY
Bean, Brooks, Buckley+Bean
ATTORNEYS

Feb. 8, 1966 C. A. WIKEN 3,233,826
VOTING MACHINE
Filed June 5, 1964 13 Sheets-Sheet 13

INVENTOR.
CHRISTY A. WIKEN
BY
Bean, Brooke, Buckley & Bean
ATTORNEYS

United States Patent Office 3,233,826
Patented Feb. 8, 1966

3,233,826
VOTING MACHINE
Christy A. Wiken, Pittsburgh, Pa., assignor to Automatic Voting Machine Corporation, Jamestown, N.Y.
Filed June 5, 1964, Ser. No. 372,930
13 Claims. (Cl. 235—51)

This invention relates to voting machines for registering the choices of voters at public elections or the like, and for giving the totals of votes cast for the respective candidates or propositions or the like, at the conclusion of the balloting.

A primary object of the present invention is to provide an automatic voting machine of improved mechanical simplicity which meets a specific ballot requirement, and yet is readily adaptable to modification so as to meet a variety of other requirements.

Another object is to provide an improved machine as aforesaid which presents to the voter a ballot panel of a format which is familiar to persons having previously voted only with certain type paper ballots, and facilitates the making of a single selection from a multitude of choices.

Another object is to provide an improved voting machine as aforesaid featuring the provision of a voting panel which presents party and candidate listings cross-referenced in either vertical or horizontal alignments, respectively; and a single candidate selection device manually movable for vertical and horizontal translations to sweep the voting area of said panel, whereby the voter may effect a vote registration for any candidate represented on the ballot panel.

Another object is to provide an improved voting machine as aforesaid wherein the vote selecting device may be "set" in voting position, and subsequently reset by the voter at will, whereupon the machine will ultimately record only the final selection of the voter.

Another object is to provide an improved machine as aforesaid which automatically records a voter's selection but only incidental to his leaving the machine.

Still another object is to provide an improved machine as aforesaid including means preventing the voter from causing the machine to record more than one vote in association with a single ballot.

Another object is to provide a machine as aforesaid from which the total votes cast for the represented candidates are automatically totaled for canvassing by the election officials.

Another object is to provide a machine as aforesaid having draw curtain means for hiding the voter and the voting operation from public view; said draw curtain means being automaticaly operable by manual actuation of a control device; said control device being operably coupled to mechanism causing, in sequence, the selected vote to be recorded; the vote selector to be restored to "home" position; and opening of said curtain means to permit exit of the voter from the machine.

Another object is to provide an improved machine as aforesaid which facilitates "blank" or null voting, if the voter chooses not to vote for any listed candidate while pretending to vote.

Other objects and advantages of the invention will appear from the description hereinabove and the accompanying drawing wherein.

The invention contemplates an improved voting machine characterized in general as follows.

The machine is housed within a readily closable and sealed cabinet, and is relatively lightweight and compact and of rugged form and therefore easily portable. To prepare the machine for use, the front door panels are swung open to parallel outstanding attitudes, and then held in place by a top crossbar and curtain rod mechanism. A pair of curtains are then suspended from the curtain rod and connected to a pull cable system which in turn is operably connected to the voter operating lever 30 which is adapted to be swung away from its "home" position by the voter after he enters the machine, and then returned to its "home" position when the voter is ready to register his vote and exit from the machine. Thus, the door panels and curtain arrangements provide means totally enclosing the voter throughout the period when he is manipulating the vote selection mechanism; thereby insuring complete voting privacy.

When the voter enters the machine he faces a voting panel presenting to view a multitude of possible vote choices, which may for example include vertically-horizontally cross-referenced alignments of party and candidate representations, and/or questions or propositions, or the like. In front of and to one side of the panel stands a vertical column which is manually movable from side-to-side across the voting panel area and carries a vertically slidable vote selector device having a hand knob thereon for manual control by the voter so that he may sweep the entire voting panel area with the vote selector. Upon proper placement of a position indicator portion of the selector over the target on the panel which corresponds to the desired vote, the knob may be manually pressed inwardly, thereby "setting" the machine for subsequent recording of the desired vote. Manual movement of the control lever back to its "home" position will then cause the machine, in sequence, to record the desired vote; return the vote selector device to its "home" position; and then finally open the curtains, thereby permitting the voter to exit from the machine. The voter control lever and the vote selector device are both normally locked in their "home" positions by latches, and the latch controlling the voting lever is only releasable by means under control of an "entry" button which is operated from externally of the machine by an election official when the official is satisfied that the prospective voter is qualified.

At the end of the balloting period the election officials may open the back cover panel of the machine whereupon the counters exhibiting the total votes cast for respective candidates are readily viewable through a transparent cover plate, which prevents tampering with the counters during the read-off process. The machine furthermore features the provision of novel and improved detail mechanisms which facilitate the functions of the machine hereinabove outlined, and which render the operation fail-proof and fraud-proof and automatic in every respect except for the manual selection by the voter of his desired vote. A more detailed specification of the novel operative components of the machine will now be provided as follows.

The ballot panel

As shown by way of example in the drawing herewith, the ballot panel structurally comprises a rectangular board 40 which carries a plurality of vertical track devices 42 into which are slip-fitted vertical ballot strips 44 bearing in each case a column identifying numeral and a party designation, and therebelow a succession of candidate names (or other voter choice indicia). Each ballot strip is fronted by a companion transparent cover strip as indicated at 45 upon which appear target areas 46 corresponding to each candidate name block; the target areas being so located that when the vote selector position indicator (as will be explained more fully hereinafter) is aimed at the target corresponding to the voter's choice, the desired vote will be set up. To facilitate insertion of ballot strips incidental to each new election, the ballot board 40 may be simply tilted forwardly on its bottom edge relative to a support sill 48 (FIG. 18) forming a portion of the machine frame, whereby the top ends of the sockets behind the transparent strips 45 are conveniently disposed for removal and insertions of ballot strips.

The counter bank

As shown in FIGS. 3, 4, 5, 17, 18, a bank of totalizing counters as indicated generally at 50 is carried across the rear of the machine, in parallel congruence to the ballot panel, and comprises a plurality of vertically disposed "columns" of counters as indicated individually at 52; each column comprising a plurality of like counter units individually indicated at 55. The counters 55 are thereby disposed in correspondence with each candidate name block and spaced therebehind. The counters 55 may be of any desired type operable by reciprocating in-line motion, and as shown herein each counter has a plunger 56 extending therefrom for actuation by a "slave" vote actuator as indicated generally at 58 which is vertically slidable on a post 60 extending vertically from a base plate 62 which moves horizontally in consonance with the vote selector as will be explained in detail hereinafter. The slave actuator is cocked by pushing against a control knob on the vote selector (also as will be explained hereinafter), and the actuator 58 includes a spring-loaded "catspaw" or push pad 63 which, when the vote selector is "on target," registers with and actuates the plunger 56 of the counter corresponding to the voter's selection, which mechanism will also be described more fully hereinafter.

The vote selector

The vote selector is indicated generally at 65 (FIGS. 1, 2, 4, 5, 7, 16, 17, 18, 18A, 19) and includes a bracket 66 which slidably mounts upon a vertically disposed front column 67 by means of a track 68; the front column being mounted at its top end relative to the rear post 60 by means of a plate 69 and at its bottom end on the plate 62 so as to stand forwardly thereof in parallel relation to the rear post 60. The base plate 62 is supported by a carriage plate 71 having rollers 72, 74 embracing a round way 75 which is fixed to the machine frame 76 (FIG. 18); and thus the vote selector mechanism is arranged to traverse the horizontal extent of the voting panel. At its upper end the column 60 glides between guides 78, by means of rollers 79 (FIG. 4), and a handle 80 may be provided as shown to facilitate manual displacements of the selector unit by the voter, as desired.

Figures 16, 16A, 17:
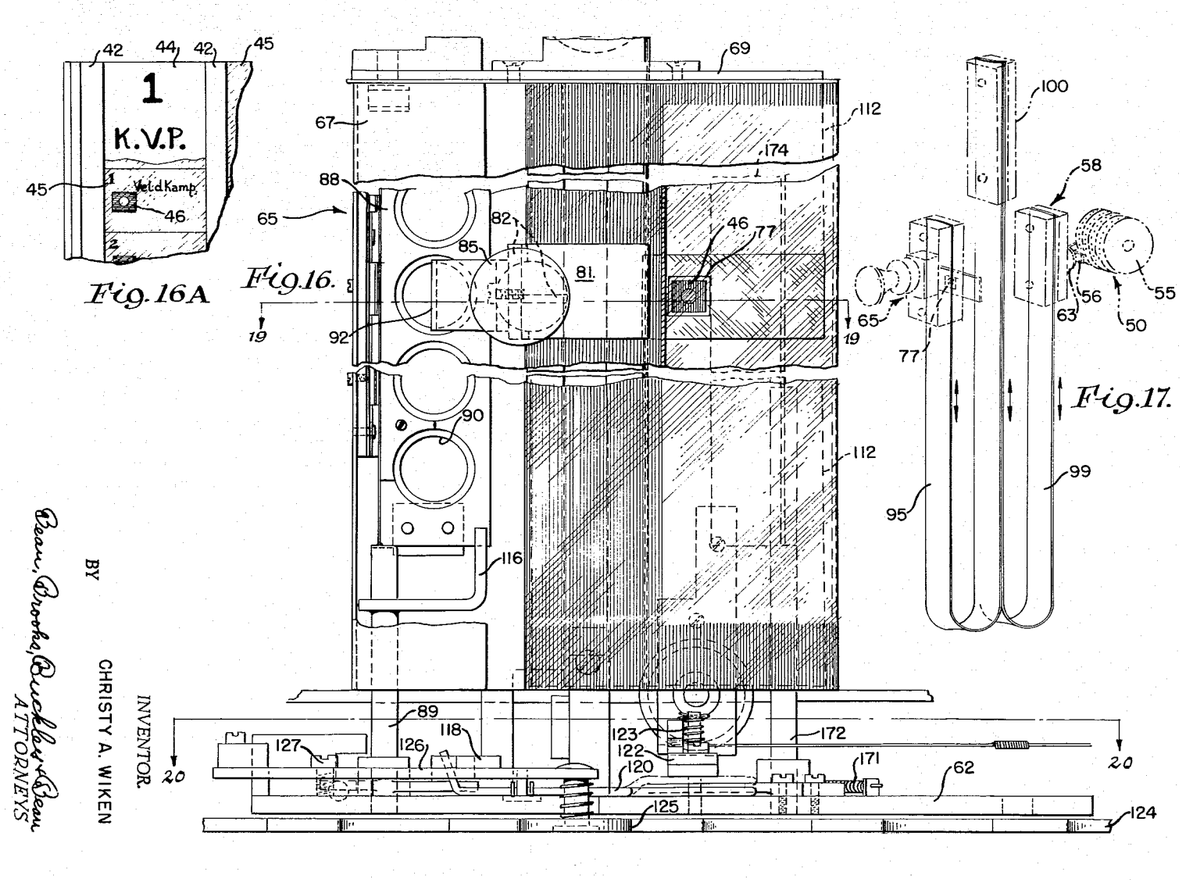
FIG. 16 is a fragmentary enlarged scale front elevational view, with portions broken away, of the vote selector device taken as suggested by line 16—16 of FIG. 19.
FIG. 16A is a fragmentary enlarged scale front elevational view of the portion of the voting panel encircled at 16A, FIG. 1.
FIG. 17 is a schematic perspective view of the vote selector and its "slave" vote registering mechanism.
Figure 19:
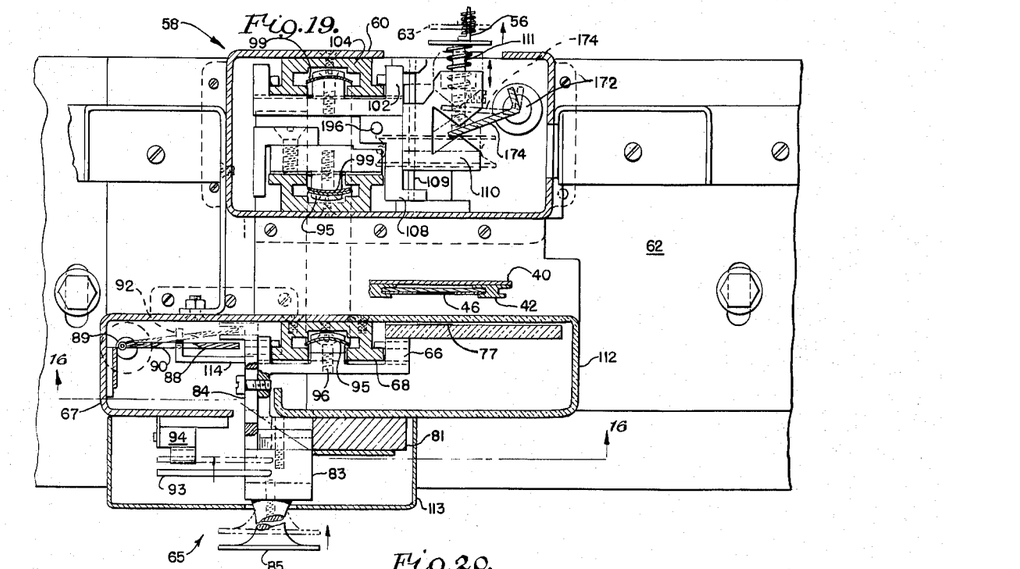
FIG. 19 is a fragmentary sectional view taken as suggested along line 19—19 of FIG. 16.
Figure 20:
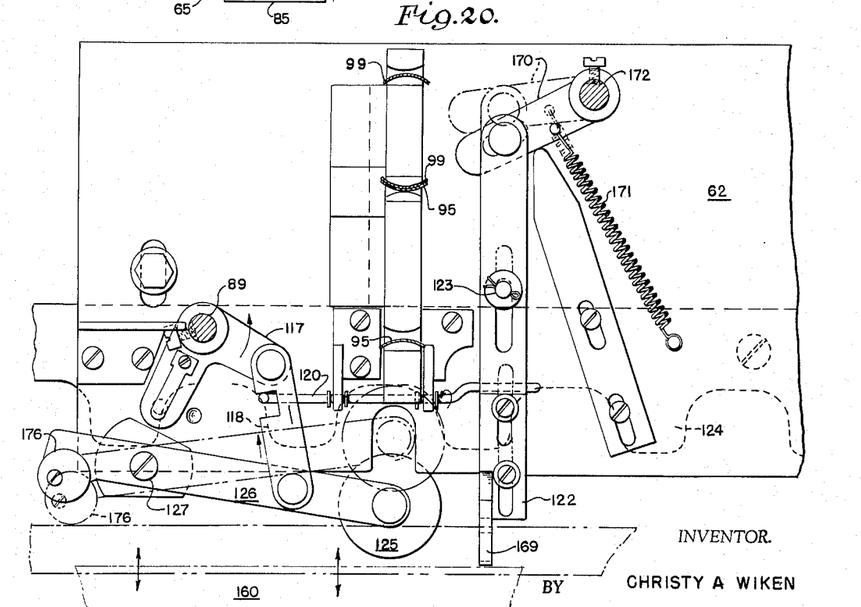
FIG. 20 is a fragmentary sectional view taken as suggested by line 20—20 of FIG. 16.
Figure 22:
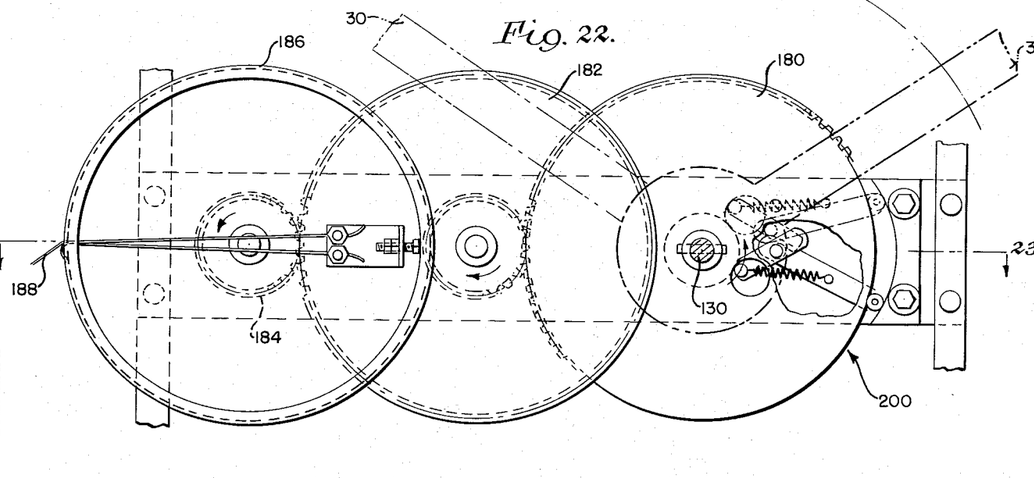
FIG. 22 is an enlarged scale view of the lever gear connected mechanism and associated devices.
Figure 23:
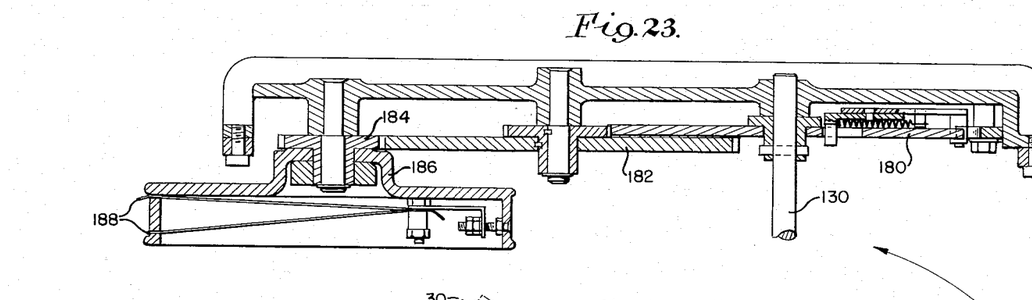
FIG. 23 is a sectional view taken as indicated by line 23—23 of FIG. 22.

Thus, it will be appreciated that the support post unit comprising the post 60, the column 67 and the track 68 encompass the ballot panel 40 in horizontally free sliding relation therewith, and that the selector 65 is also free to be manually moved vertically on the track 68. As shown at 77, a vote selector position indicator of "bull's eye" form is printed on a transparent extension of the bracket 66. To enclose the travel of the position indicator portion of the vote selector, a plexiglass (or other transparent material) casing as shown at 112 is fixed to the track 68, and to enclose the selector knob shaft and light switch mechanism, a casing 113 is mounted as shown The selector bracket 66 includes a forwardly disposed guide portion 81 which is slotted and recessed as indicated at 82 (FIG. 16) to slidably accommodate corresponding fin portions 83, 84 of a selector knob 85 which is held in place on the bracket by means of a pin 86 (FIG. 19) to be slidable inwardly as shown in FIG. 19 to cock the slave actuator, as will be explained hereinafter. To prevent cocking of the slave actuator except whenever the selector is "on target" in vertical direction, a control bar 88 is mounted on the base plate 62 by means of a vertically standing drive shaft 89 (FIGS. 16, 20, 22). The bar 88 is formed with a series of apertures 90 in vertical alignment and at successive elevations corresponding to the levels of successive voting target designations. The selector knob 85 is provided with an axially extending nose portion 92 which will enter one of the apertures 90 whenever the selector is "on target," thus permitting the knob to be displaced sufficiently to cock the slave actuator, as will be more fully explained hereinafter. If the nose 92 does not register with an opening 90, the knob 85 is blocked from being depressed. The knob 85 carries a lateral abutment 93 which actuates a switch 94 to energize a light 94A when the knob is depressed to cocking position, thus confirming to the voter that his selection will register.

Figures 18, 18A:
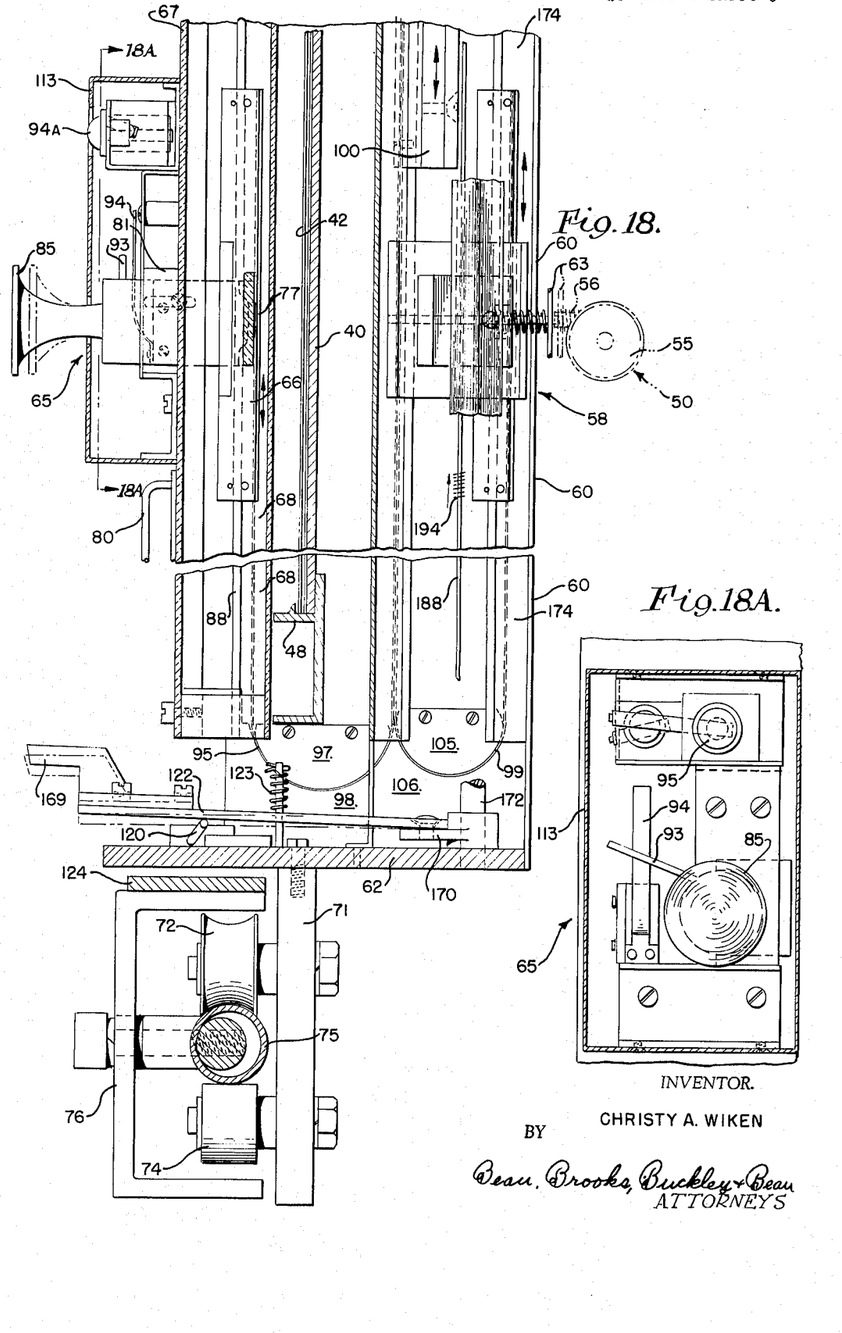
FIG. 18 is an enlarged scale vertical sectional view taken as suggested by line 18—18 of FIG. 5.
FIG. 18A is a fragmentary enlarged scale view as suggested at 18A—18A (FIG. 18) of the voting button and associated light control device.

The selector is interconnected with the slave actuator 58 so that they move vertically in consonance, one with the other. As shown in FIGS. 17-18, a suitable type of interconnection comprises a tape device as indicated at 95 which is fixed at one end to the selector bracket 66 as indicated at 96 (FIG. 20). The tape 95 may be of the conventional steel measuring tape type which is sectionally curved (FIGS. 19, 20) to be rigid under column loadings but beam-wise flexible so as to readily negotiate reverse directional turns when enclosed between properly diametered guide shoes as indicated at 97-98 (FIG. 18). The opposite end of the tape 95 is fixed to one end of a companion tape 99 (FIGS. 18, 19, 20) and is preferably provided thereat with a counterweight as indicated at 100 (FIG. 17). At its other end the tape 99 connects to a slave bracket 102 which rides on a vertical track 104 carried by the post 60, which positionally corresponds to the track 68 upon which the selector bracket 66 rides; the tape 99 also training through guide blocks 105, 106 (FIG. 18) supported on the base plate 62. A bearing block 108 (FIG. 19) is fixed to the slave bracket 102 and slidably mounts thereon by means of a pin 109 a mount block 110 which slidably mounts the stem portion 111 of the "cat's-paw" 63. The cat's-paw 63 is thereby positioned on its support so that whenever the selector target portion 77 is positioned to overlie any voter selected target area 46, the cat's-paw will be in registry with the actuating plunger 56 of the counter corresponding to the selected target area.

Figures 21, 28:
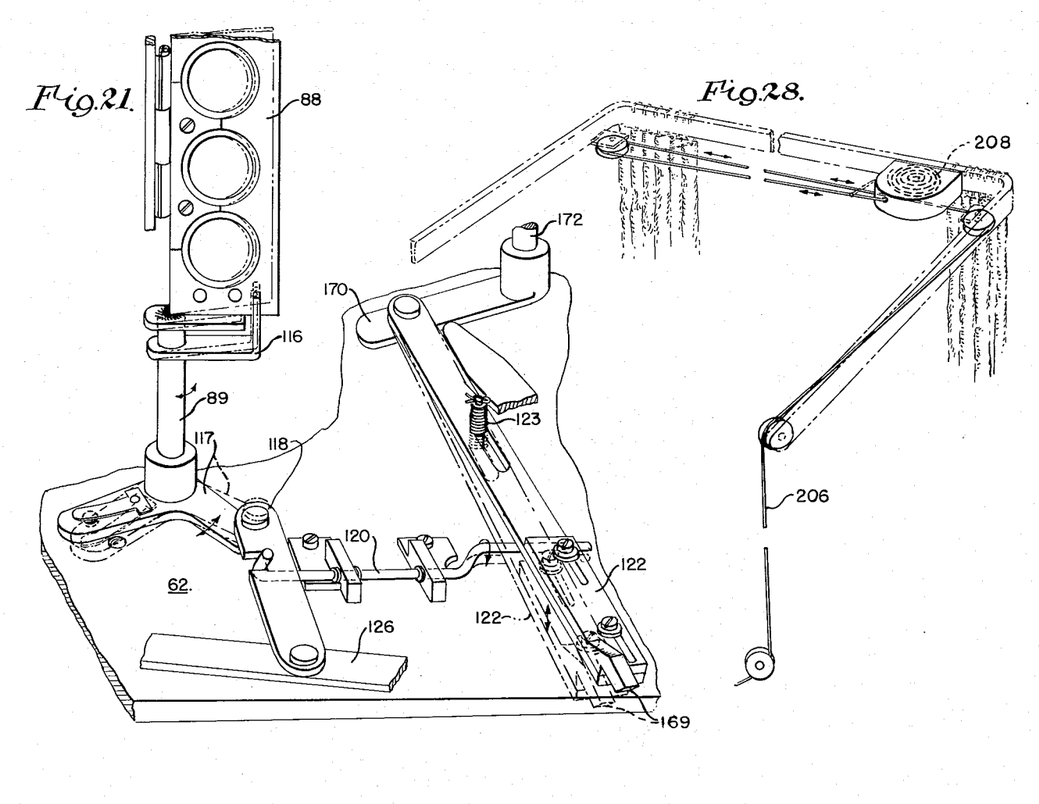
FIG. 21 is a fragmentary perspective view of the mechanism illustrated by FIG. 20.
FIG. 28 is a fragmentary perspective view illustrating a portion of the curtain control spring and control cable system.

When the voting knob 85 is pressed toward vote setting position sufficiently to cause the light 94A to come on, a shoulder portion 114 on the knob comes into bearing relation with the hinged bar 88 and causes it to swing about its vertical hinge axis, and through a yoke coupling 116 this causes the shaft 89 to rotate (FIG. 21). Rotation of shaft 89 causes bell crank 117 to throw link 118 so as to turn crank 120 which permits a drive bar 122 to pivot downwardly (FIGS. 18, 21) under the bias of a spring 123 to the broken line position as shown in FIGS. 13, 18, 21.

To insure horizontal centering of the cat's-paw relative to the counter corresponding to the voter's choice, a comb bar 124 is mounted on the stationary channel 76 (FIGS. 2, 5, 16, 18, 20) and a roller 125 for registry with the detents of the comb bar is carried by a link 126 (FIGS. 16, 20, 21) which is pivoted to the bottom plate 62 as indicated at 127 (FIGS. 16, 20). The link 126 connects to the cross link 118, and the parts are so arranged that unless the roller 125 is bottomed in a recess of the comb bar 124 the linkage blocks inward movement of the knob 85 for the purposes explained hereinabove. Hence, unless the selector device is in horizontal registry with a target area, the knob 85 may not be depressed into vote setting position. However, it will be noted that both the vertical and horizontal target centering mechanisms are automatically self-centering and assist the voter in positioning the selector "on target." The machine is now ready to register the voter's choice.

As shown herein the voter control lever 30 is keyed at its bottom end to a shaft 130 which is journaled in the machine frame. It is in "home" position when swung over to the left as viewed from the front of the machine, and is normally locked in this position (FIG. 6) by a mechanism under control of a voting official who may release the lock by depressing an "entrance" button 132 (FIG. 2) when he is satisfied that a prospective voter is qualified. A key-controlled lock as shown at 131 (FIG. 2) is provided to control the entrance button 132, and is left unlocked only during the voting period. The button 132 operates through a bell crank 133; strut 134; bell crank 135 and strut 136; a latch 137 which engages a pin 138 extending from a crank arm 139 carried by lever shaft 130. A spring 140 biases the latch mechanism toward locking position.

Figure 1:
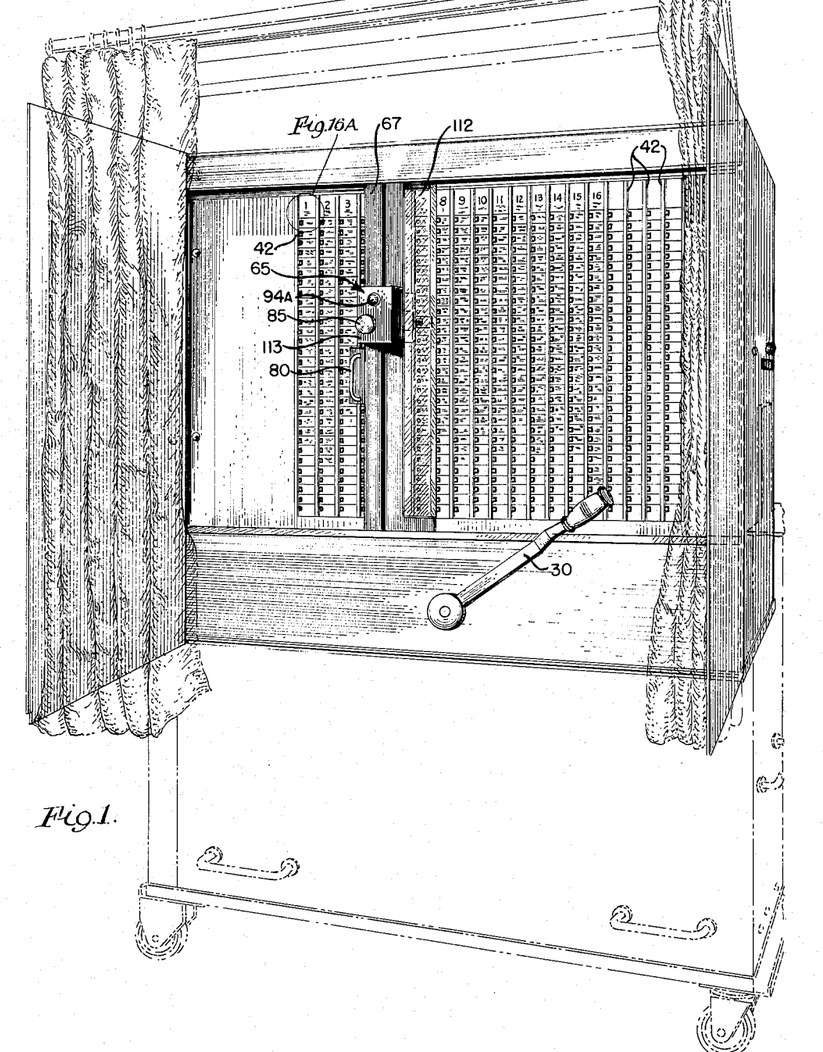
FIG. 1 is a front perspective view of a voting machine embodying the present invention, showing the privacy curtains withdrawn to reveal the voting panel as viewed by the voter when operating the machine.
Figures 10, 11, 12, 13:
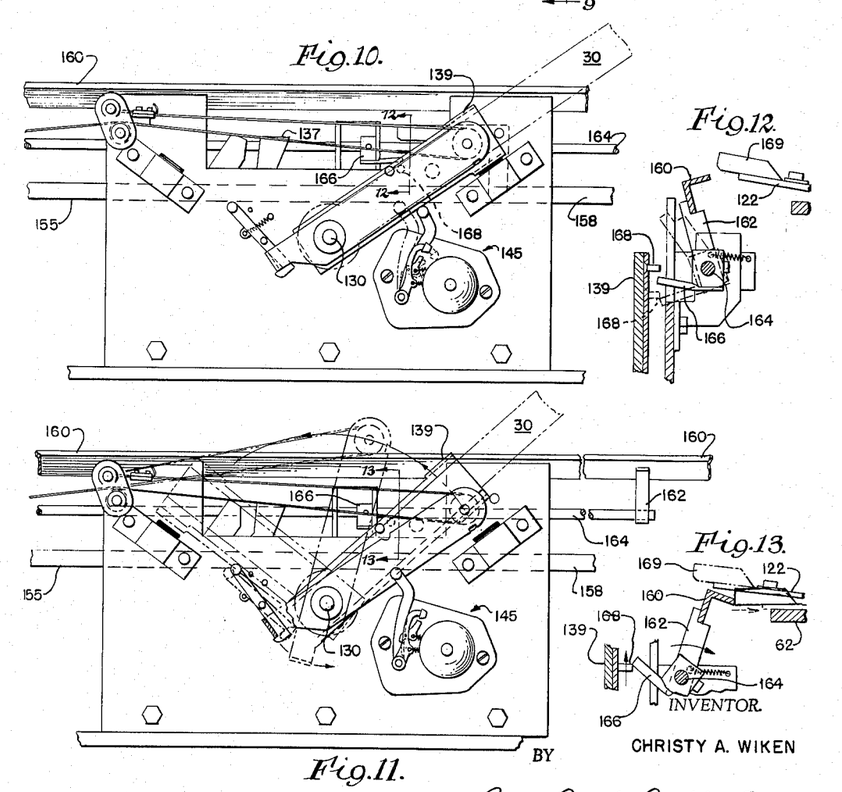
FIGS. 10 and 11 are views corresponding to FIG. 8 but illustrating the control lever and associated mechanism in different control positions.
FIG. 12 is a fragmentary section on enlarged scale taken as suggested by line 12—12 of FIG. 10.
FIG. 13 is a fragmentary section on enlarged scale taken as suggested by line 13—13 of FIG. 11.

When the voter enters the machine, assuming button 132 is depressed, he swings the lever 30 fully to the right side of the machine (FIGS. 1, 10). This action first closes the curtains, and then at the end of the lever stroke a lock device as indicated at 144 which previously held the selector-slave column in "home" position is unlocked, and simultaneously therewith the "public counter" actuator is advanced one-half of a counting cycle. Also, a bell device as indicated at 145 is now actuated as shown in FIG. 10 by the lever crank arm 139, thus confirming to the voter that the machine is ready to be voted.

The lock mechanism 144 includes a latch 146 which is pivotally carried by a bracket 147 (FIG. 7) which is supported by the machine frame; the latch being normally biased by a spring 148. The latch engages a pin 150 which extends from a bell crank 151 pivotally mounted at 152 to the machine frame. The other end of the bell crank is engaged in cammed relation by a pin 153 extending from the carriage plate 71, whereby the carriage is blocked from movement as long as the latch 146 is in holding position. The pin 138 on the lever crank arm 139 engages a bell crank 154 (which is pivoted on the machine frame) to cause it to swing and pull a control rod 155. The rod 155 carries a bracket 156 from which depends a pin 157 engaging the latch 146, so as to swing it out of engagement with pin 150. A second rod 158 extends from bell crank 154 to linkage connecting to the public counter (FIG. 2) for actuating the latter as the lever 30 is moved from left to right, and then from right to left when the voter prepares to leave, thus registering one count on the public counter.

*Completing of the voting cycle*

After the voter places the selector "on target" and presses in the plunger 85, he prepares to leave the machine by pulling the lever 30 from its right hand position (FIG. 1) over to its furthermost left hand or "home" position. At the start of this phase of the operation, movement of the handle 30 as from position A to B (FIG. 15) causes the cat's-paw 63 to depress the plunger 56 of the selected counter to move in so as to advance the counter mechanism one-half of a count cycle. This action is obtained through means of a striker bar 160 (FIGS. 5, 8-13, 20) carried by a pair of struts 162 extending from a rocker bar 164. The bar is journaled in the machine frame and is rotated by means of a crank arm 166 which is cammed by a pin 168 extending from the lever crank arm 139 (FIGS. 8-13). The parts are so arranged that when the lever so is moved from position A to B (FIG. 15) the pin 168 cams the arm 166 (FIG. 13) so as to throw the striker bar 160 against the end of a pad 169 carried by the drive bar 122, so as to push the drive bar rearwardly (FIG. 20) which in turn causes rotation of a crank 170 keyed to a shaft 172 (FIGS. 16, 18-21). A spring 171 (FIG. 20) biases the drive bar 122 back toward non-registering position.

Rotation of shaft 172 causes corresponding rotation about a vertical axis of a control bar 174 which slip-fits throughout its vertical extent into a crotched portion (FIG. 19) of the mount block 110 which carries the cat's-paw shaft 111. Thus, regardless of the vertical setting of the selector-slave unit, motion of the lever 30 from position A to B (FIG. 15) will cause the cat's-paw 63 to move from its solid line to its broken line position in FIG. 19, thereby actuating the selected counter through one-half of a registering cycle.

Upon movement of the lever 30 from position B to C the pin 168 moves beyond the crank arm 166 and releases the striker bar 160 (FIG. 12). Incidentally therewith movement of striker bar 160 causes it to bear against a button 176 on arm 126 (FIG. 20) so as to pivot link 118 outwardly. This rotates crank 120 so that its portion extending under drive bar 122 rises and lifts the bar 122 (FIGS. 18, 21) free from engagement with the striker bar 160. This allows spring 171 to return the drive bar 122 forwardly, releasing the cat's-paw plunger and permitting the spring on the counter plunger to return the plunger, thus completing the vote registering cycle. Also, incidentally thereto and immediately following completion of the counter operation, the striker bar 160 causes centering roller 125 to leave the comb bar 124, and shaft 89 to rotate so as to move vertical bar 88 from its broken line position (FIGS. 19, 21) to the solid line position thereof, thereby forcing selector knob 85 to move out to its normal or solid line position as shown in FIG. 19.

Figure 14:
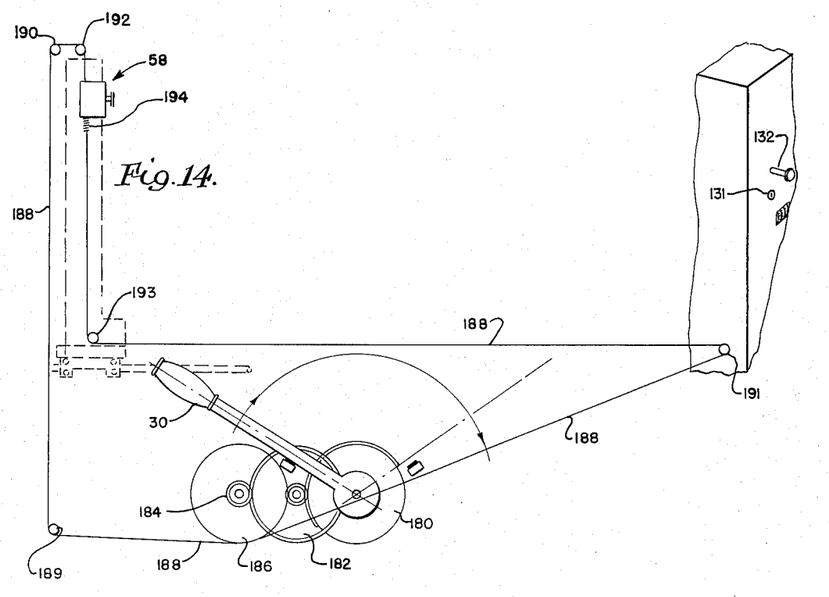
FIG. 14 is fragmentary schematic view of the voter control lever and connected gear and cable system for returning the vote selector to "home" position.

The lever shaft 130 carries a gear 180 (FIGS. 14, 15, 22, 23) which meshes through an idler 182 with a drive gear 184 keyed to a drum 186 to which are fixed both ends of a cable 188. The cable trains around guide pulleys 189, 190, 191 which are positionally fixed on the machine frame (FIGS. 14, 15), and also around pulleys 192, 193 carried at the top and bottom, respectively, of the selector column to move therewith. A resilient drive device, in the form of a compression spring 194 is fixed to the cable as shown in FIG. 14, and the cable slides through an aperture 196 in the slave unit block 108 (FIG. 19). Hence it will be seen that when the lever 30 is moved away from its "home" position as shown in FIG. 14, the cable will simply thread through the pulley system without moving the selector column while the spring 194 is carried by the cable to the position shown in FIGS. 2, 15.

Figure 2:
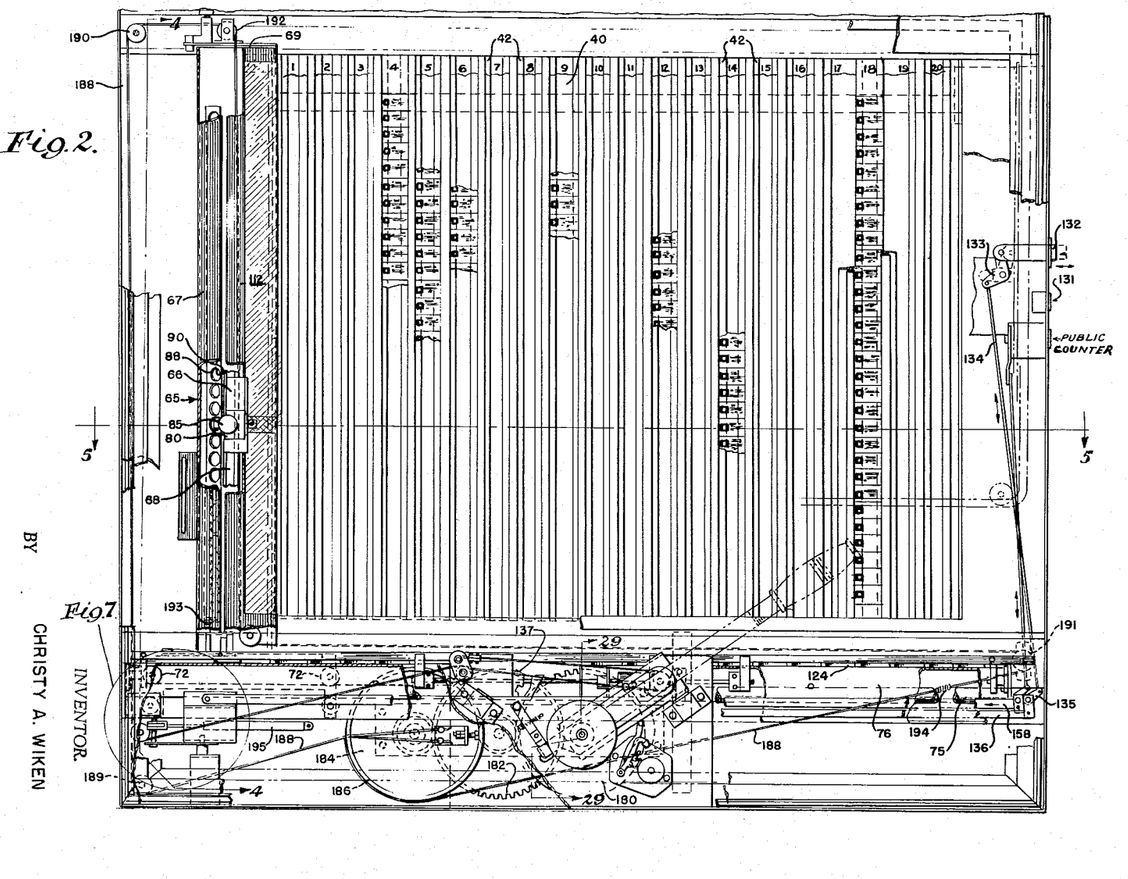
FIG. 2 is an enlarged scale fragmentary front elevational view of the voting panel portion of the machine, with the operating gear cover removed to show the voter lever control mechanism.

The spring 194 is so located on the cable that when the lever is moved from position A towards the left, the spring 194 will not come into bearing relation against the bottom of the slave unit 58 (regardless of the position of the selector column and of the position of the selector on the column) until after the counter mechanism has completed its function. Then, when the spring 194 reaches the slave block 108 and bears upwardly thereagainst, the weight of the selector-slave unit provides sufficient resistance to cause the cable system to pull the selector column to the left into its "home" position overlying a blank area of the ballot panel as shown in FIG. 2. Finally, the cable action causes the selector-slave unit to rise to the top of the column (FIG. 14). This action returning the selector to its "home" position occurs incidental to movement of the lever 30 from position C to D. When the lever reaches position D the pin 150 of lock mechanism 144 (FIG. 7) cams into locking position with latch 146, thereby locking the selector column in its "home" position. A damper as indicated at 195 (FIGS. 2, 7) is preferably employed to cushion the homing movement of the selector column.

Figure 15:
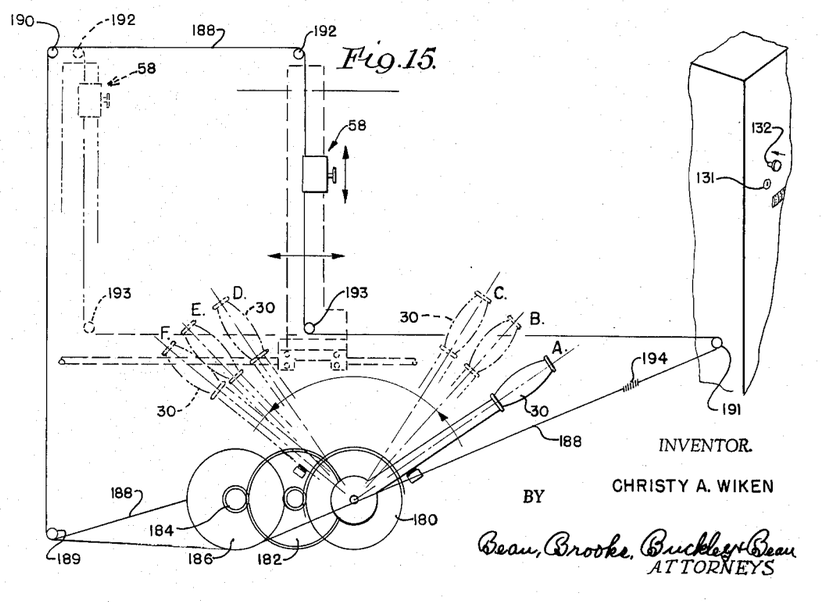
FIG. 15 is a view corresponding to FIG. 14, but illustrates the control lever in six different operative positions.

The privacy curtain cable control system may be connected to the lever shaft 130 in any conventional manner so that when the lever 30 is moved from position D to E (FIG. 15) the privacy curtains automatically open; and simultaneously therewith the entrance button latch 137 engages pin 138 of lever 139. This prevents lever 30 from being returned toward position A again until such time as some suitable form of "full stroke" control device (as shown for example at 200 in FIGS. 22) reverses itself to allow the lever 30 to be moved again towards the right (assuming the entrance button 132 to be depressed). Automatic reversing of the full stroke device 200 occurs during movement of the lever 30 from position E to F (FIG. 15). The voter now exits from the machine, and the machine is available for the next voter. At the end of the voting period hinged doors at the rear of the machine are unlocked and swung open whereupon the voting officials may readily view and read-off the totals of votes cast for the respective candidates or other voter choices.

Figure 3:
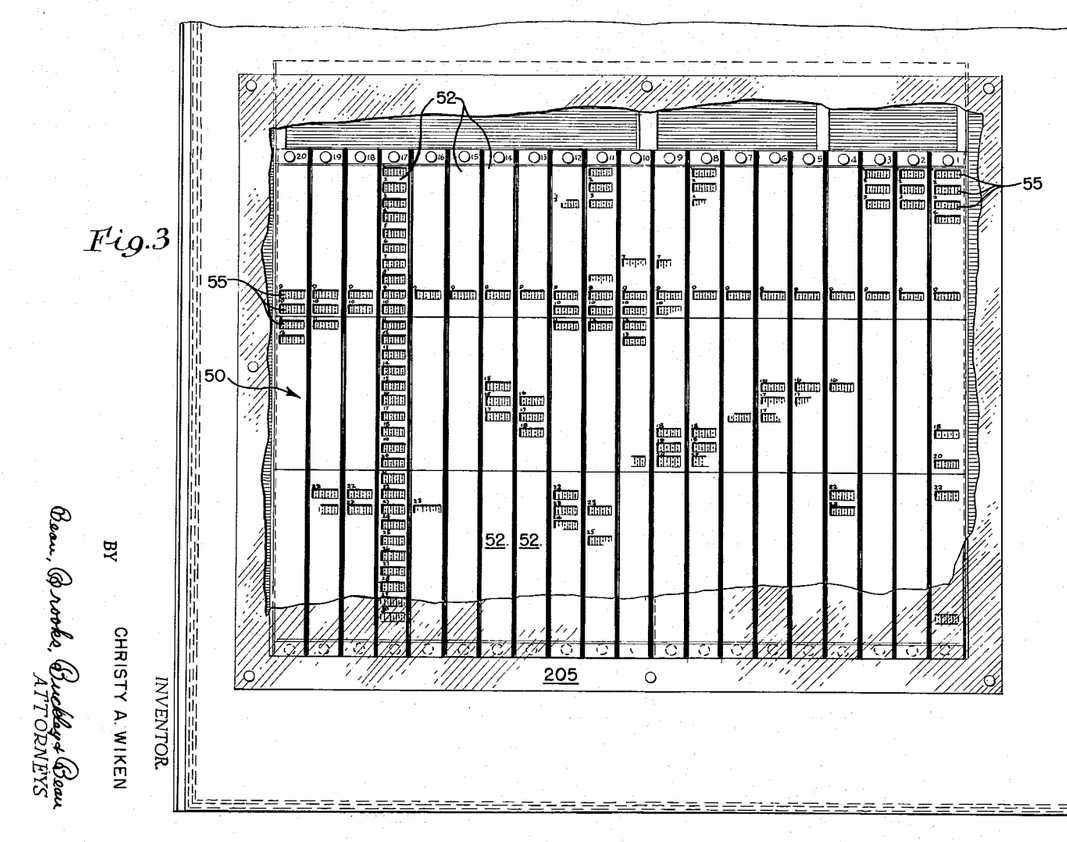
FIG. 3 is a fragmentary rear elevational view of the machine, with the back cover removed, showing the totalizing counters in view for canvassing by the election officials.
Figures 4, 6:
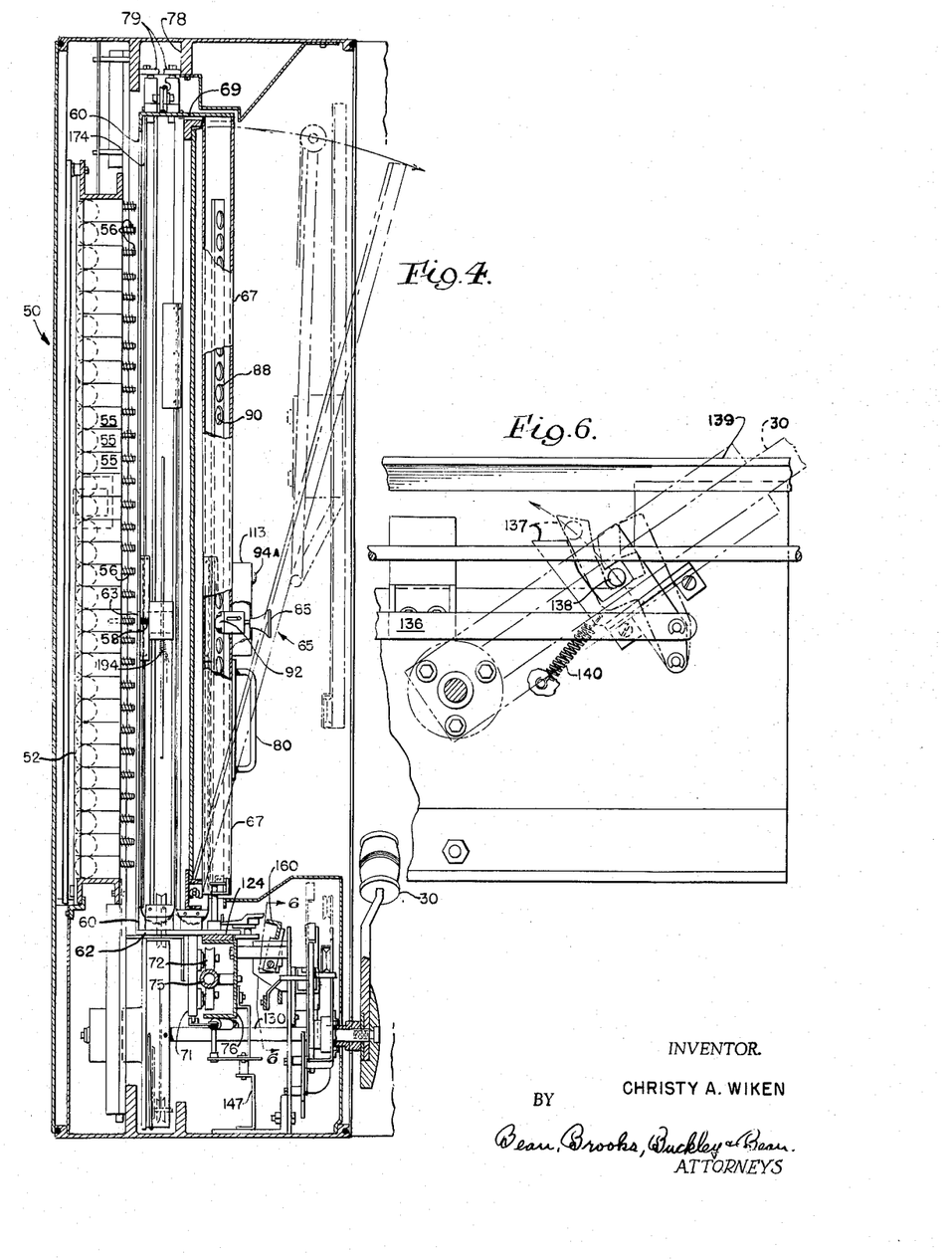
FIG. 4 is a vertical sectional view, on enlarged scale, taken as suggested by line 4—4 of FIG. 2.
FIG. 6 is a fragmentary section on enlarged scale, taken on line 6—6 of FIG. 4.
Figures 5, 7, 29:
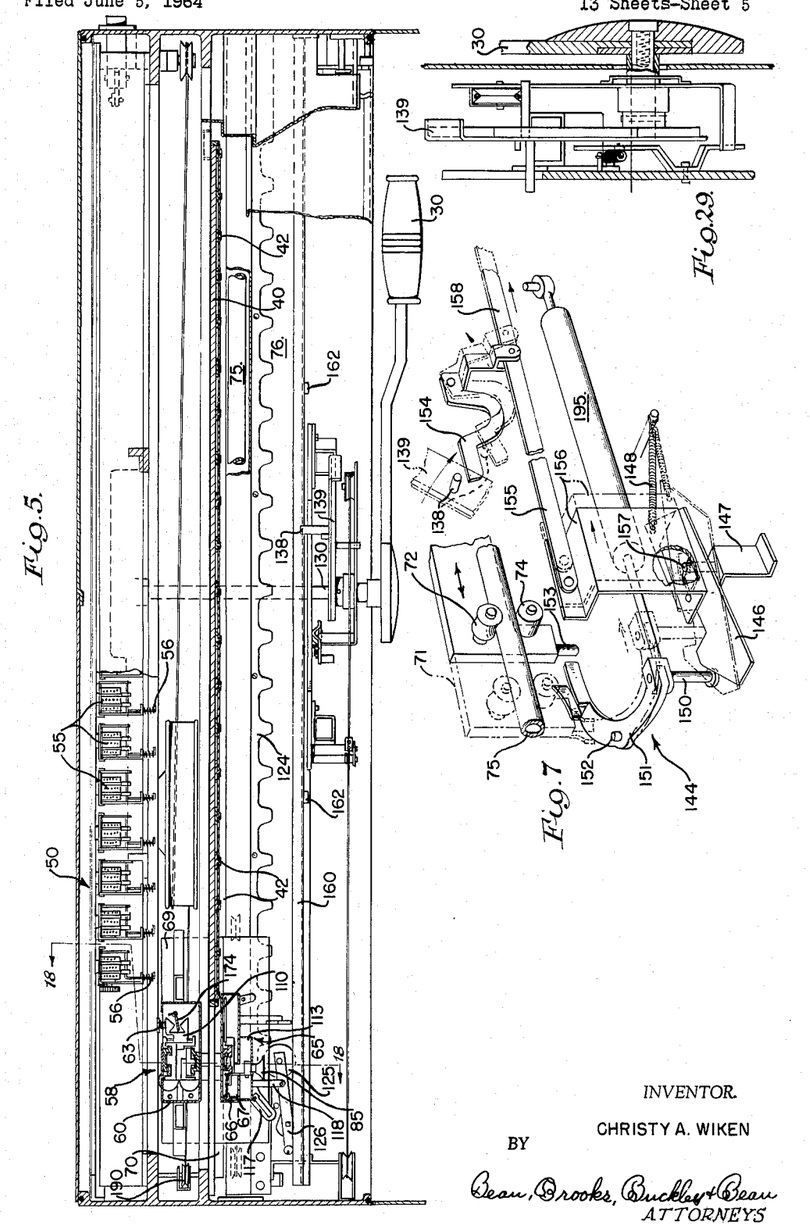
FIG. 5 is a horizontal sectional view on enlarged scale, taken as suggested along line 5—5 of FIG. 2.
FIG. 7 is a fragmentary perspective view of the mechanism encircled at 7, FIG. 2.
FIG. 29 is a fragmentary sectional view taken as suggested on line 29—29 of FIG. 2.
Figures 8, 9:
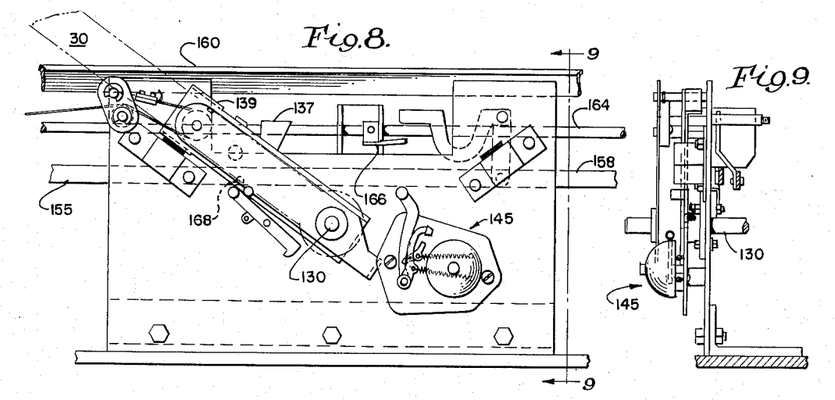
FIG. 8 is a fragmentary front elevational view on enlarged scale of a portion of the voter control lever and connecting mechanism, when the control lever is in its "home" position.
FIG. 9 is a fragmentary section taken as suggested along line 9—9 of FIG. 8.

As illustrated at FIG. 3 of the drawing herewith, a transparent panel designated 205 is preferably provided to seal-off the counter bank during the tallying process to prevent tampering therewith. Then upon completion of the tally the cover plate 205 is removed and the counters are reset to zero positions preparatory to the next voting operation, as by any suitable reset technique comprising no portion of the present invention per se.

Thus, it will be apparent that the mechanism hereinabove described and illustrated provides a voting machine featuring provision for a voter to make a single selection from a multitude of choices such as may be presented on a voting panel susceptible of a large variety of ballot formats. Furthermore, the machine features the provision of novel interrelated mechanical devices facilitating voter use of the machine, while at the same time guarding against unauthorized operation of the machine. Although in the drawing herewith only one voting panel is illustrated as being available to the vote selector, it will of course be understood that any preferred number of separate and independent panels (with corresponding counter banks there-behind) may be provided to be available to the vote selector so that the voter may vote for more than one candidate or on more than one question, or the like, as may be required. Also, it will be apparent that the machine may be arranged to be "blank" voted in event any voter prefers not to vote for any listed candidate while still pretending to do so. For this purpose any space on the ballot panel may be left open and either marked "blank" or not, as may be preferred, whereby any vote registered thereagainst will be simply a null or non-vote.

Figure 24:
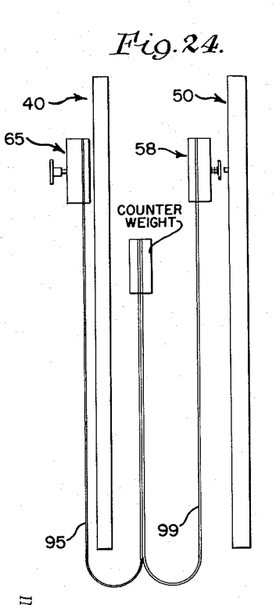
FIG. 24 is a schematic side elevational view of the vote selector control and slave and vote registering components of the machine illustrated by FIGS. 1–23 inclusive.

The selector-slave unit comprising the carriage structure mounting the selector 65 and the slave actuator 58 and the interconnecting drive tape arrangement as shown in FIGS. 1–23 of the drawing herewith, is schematically illustrated at FIGS. 17 and 24 of the drawing. It is a particular feature of this arrangement that the slave actuator 58 precisely follows up and down movements of the selector 65, and provides for precise registry of the counter actuating cat's-paw whenever the selector target 77 is spotted on a ballot target 46. This is because the tape system interconnecting the selector and the slave actuator introduces no cumulative mechanical lost motion effects such as are normally introduced through manufacturing tolerances in connection with other type motion transmission systems. The counterweight 100 is provided in order to substantially balance the gravity effects on the selector head and the slave actuator device, so that the selector may be easily moved by the voter and does not tend of its own accord to shift its vertical position on the post-column unit.

It will of course be appreciated that various conventional type accessory appliances may be employed in conjunction with the machine of the present invention. For example, the privacy curtain and support control system may be of any preferred type, the object in any case preferably being to provide for automatic closing of the curtain after the voter enters the machine and prior to his shifting of the selector into position relative to any voting area. Also, the control system will preferably provide for automatic opening of the curtain for exit of the voter, but only after the voter's choice has been registered and the selector has been returned to its "home" position, whereby there will be no public revelation of the voter's choice. Hence, as explained hereinabove, the curtain control system may include a pull cable such as indicated at 206 in FIG. 28, attached to the mechanism operated by the voter lever 30 so that when the lever is moved from left to right as viewed from the front of the machine the curtain cable will be pulled upon so as to draw the curtains together into closed position against the action of a coil spring such as shown at 208. Then upon return of the voter handle 30 to "home" position at the left hand side of the machine, the cable 206 will be released so that the spring 208 operates to cause the cable to draw the curtain open. Such arrangements are of course well known and again form no part of the present invention per se.

Figure 25:
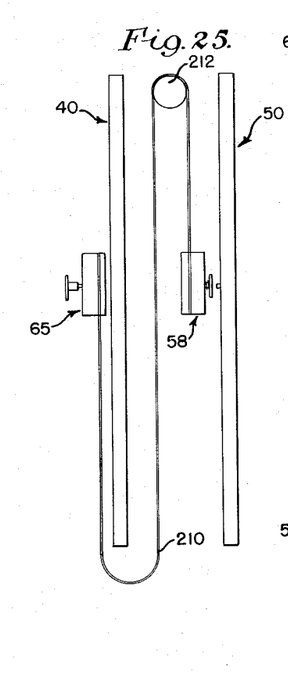
FIGS. 25, 26, 27 are views corresponding to FIG. 24 but illustrating schematically modified forms of vote selector and slave registering arrangements.

It will also be understood that although only one specific form of the machine of the invention and of the mechanical components thereof have been hereinabove described and illustrated herein by way of example, various changes may be made therein. For example, in lieu of the selector-slave actuator arrangement schematically shown in FIGS. 17, 24, an arrangement as illustrated in FIG. 25 may be employed. In this case, in lieu of the interconnected tapes 95, 99, a single tape 210 may be arranged to thread through a guide block disposed below the ballot panel 40, as in the case of FIG. 24, and then to train over a pulley 212 behind the voting panel and thence downwardly into supporting connection with the slave actuator 58 (which rides on track 104 carried by post 60) in front of the counter bank 50. Thus, upward and downward movements of the selector 65 will be matched by precisely equal following motions of the slave actuator 58, for the purposes explained hereinabove.

Figures 26, 27:
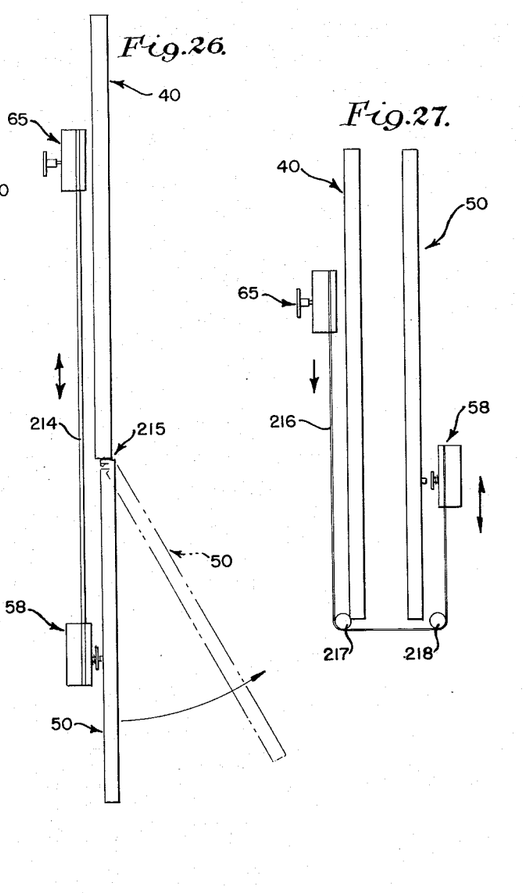

FIG. 26 illustrates still another possible arrangement wherein the vote selector 65 and the slave actuator are interconnected by means of a vertical strut as indicated at 214; the counter bank in this case being mounted above or below the voting panel 40 as shown in the drawing. In this case the selector 65 will of course be supported upon a vertical track carried by the horizontally movable carriage as explained hereinabove so that the selector may sweep the entire area of the voting panel 40. The slave actuator, being rigidly carried below the selector, will similarly sweep the area of the counter bank 50. Thus, the counter bank may be conveniently located within the base of the machine and may preferably be hinged at its upper edge adjacent the bottom edge of the voting panel so as to be swingable outwardly as to the broken line position shown in FIG. 26 to facilitate reading the counter totals at the end of the voting period.

FIG. 27 illustrates schematically still another possible arrangement wherein the counter bank 50 is disposed behind the voting panel but in "upside-down" relation to the voting panel 40. That is to say, the counters comprising the counter bank 50 will be numerically identified in upside-down relation to the voting spaces on the voting panel. Hence, the selector 65 and the slave actuator 58 may be interconnected by means of a single tape as shown at 216 training around pulleys 217, 218 so that whenever the selector is moved up, the slave actuator moves down, and vice versa. Thus, because the counter bank is in "upside-down" relation to the voting panel, the voter's choice will be registered on the appropriate counter.

Whereas in reference to the mechanism illustrated at FIGS. 17, 24, the use of a counterweight as indicated at 100 is suggested for the purpose of balancing the weights of the selector and of the slave actuator so that the selector will tend to remain of its own accord at whatever elevation the voter leaves it, other arrangements may be preferred. For example, it may be preferred to permit the selector to slowly slide down to the bottom of its mounting column, or to automatically rise to the top thereof, when released by the voter; and it will of course be appreciated that a suitable counterweight and/or spring arrangement may be coupled to the selector to attain any such purpose.

Similarly, other changes and modifications to the structure and functional components of the machine as illustrated and described hereinabove may be made without departing from the spirit of the invention and the scope of the following claims.

I claim:

1. In a voting machine, a voting panel presenting a network of voting spaces representing a plurality of candidates, a bank of counters including a vote registering counter disposed behind each of said spaces, a vote selector disposed in front of said panel and mounted relative thereto to be manually movable horizontally and vertically to sweep all of said voting spaces, a slave counter actuator carried by movable support means disposed between said panel and said bank of counters, target means carried by said selector for registry with a preferred candidate space and operably connected to said actuator to cause the latter to move relative to said bank of counters in consonance with translational movements of said voter selector relative to said voting panel, a member carried on said selector manually operable to procure actuation of that one of said counters corresponding to the selected one of said voting spaces, normally open draw curtain means closable to screen from public view the vote selecting operation, and a lever manually operable to close said curtain means prior to the vote selecting operation and manually operable at the end of the vote selecting operation to cause in sequence the "set" counter to register and the vote selector to return to "home" position and the curtain means to open for exit of the voter.

2. In a voting machine, a voting panel presenting a plurality of voting spaces representing a plurality of candidates or the like, a counter bank including a vote registering counter disposed behind each of said spaces, a vote selector manually movable to sweep the areas of all of said voting spaces for registry with a preferred voting space, a "slave" unit disposed behind said panel and in front of said counter bank and interconnected with said selector by support means operable to move said "slave" unit to sweep said counter bank in consonance with the sweeping of said panel by said selector, and means carried by said selector and manually operable to cause said "slave" unit to "set" that one of said counters corresponding to the selected one of said voting spaces for registering a vote.

3. In a voting machine, a voting panel presenting a plurality of voting spaces, a bank of counters including a vote registering counter positionally disposed to correspond to each of said spaces, a vote selector disposed in front of said panel and mounted relative thereto to be manually movable horizontally and vertically to sweep all of said voting spaces, a slave counter actuator disposed between said panel and said bank of counters and slidably carried by support means common to said selector, means carried by said selector for registry with a preferred candidate space, and means interconnecting said selector and said actuator and operable to procure translational movement of said actuator relative to said bank of counters in consonance with movements of said selector over the face of said voting panel, whereby settlement of said selector upon any one voting space will be automatically accompanied by settlement of said actuator in operative position relative to the corresponding one of said counters.

4. In a voting machine, a machine frame, a voting panel presenting a network of voting spaces representing a plurality of candidates, a bank of counters including a vote registering counter having an actuating plunger disposed to correspond to each of said spaces, a vote selector disposed in front of said panel, a carriage horizontally slidable on said frame and mounting said selector to be vertically movable thereon whereby said selector is mounted relative to said panel to be manually movable horizontally and vertically to sweep all of said voting spaces, a slave counter actuator carried by said carriage to be vertically movable thereon disposed to sweep the face of said bank of counters, target means carried by said selector for registry with a preferred candidate space and said selector being operably connected to said actuator to cause the latter to move relative to said bank of counters in consonance with translational movements of said vote selector relative to said voting panel, a pusher carried by said actuator for displacement of the actuating plungers of said counters when in registry therewith, a push button carried on said selector manually operable to "cock" said actuator pusher for actuation of that one of said counters corresponding to the selected one of said voting spaces, normally open draw curtain means closable to screen from public view the vote selecting operation, and a lever manually operable to close said curtain means prior to the vote selecting operation and manually operable at the end of the vote selecting operation to cause in sequence the "cocked" pusher to operate the selected counter to register a vote and the selector to return to "home" position and the curtain means to open for exit of the voter.

5. In a voting machine, a machine frame, a voting panel presenting a network of voting spaces representing a plurality of candidates, a bank of counters including a vote registering counter having an actuating plunger disposed to correspond to each of said spaces, a vote selector disposed in front of said panel, a carriage horizontally slidable on said frame and mounting said selector to be vertically movable thereon whereby said selector is mounted relative to said panel to be manually movable horizontally and vertically to sweep all of said voting spaces, a slave counter actuator carried by said carriage to be vertically movable thereon disposed to sweep the face of said bank of counters for actuation of the latter, motion transmission means interconnecting said selector and said actuator to cause the latter to move, relative to said bank of counters in consonance with vertical movements of said vote selector relative to said voting panel, said motion transmitting means comprising a push-pull tape rigid in compression and tension but flexible to negotiate reverse directional turns, said tape being fixed at one end to said selector and operably connected at its other end to said actuator and threaded intermediately thereof through a curved guide device mounted on said carriage.

6. In a voting machine, a machine frame, a voting panel presenting a network of voting spaces representing a plurality of candidates, a bank of counters including a vote registering counter having an actuating plunger disposed to correspond to each of said spaces, a vote selector disposed in front of said panel, a carriage horizontally slidable on said frame and mounting said selector to be vertically movable thereon whereby said selector is mounted relative to said panel to be manually movable horizontally and vertically to sweep all of said voting spaces, a slave counter actuator carried by said carriage to be vertically movable thereon disposed to sweep the face of said bank of counters for actuation of the latter, motion transmission means interconnecting said selector and said actuator to cause the latter to move, relative to said bank of counters in consonance with vertical movements of said vote selector relative to said voting panel, said motion transmitting means comprising a pair of push-pull tapes which are each rigid in compression and tension but flexible to negotiate reverse directional turns, one of said tapes being fixed at one end to said selector and extending therefrom downwardly and threaded through a curved guide device mounted on said carriage and then extending upwardly between said panel and said counter bank and connected at its other end to one end of the other of said tapes and guided thereat by vertical track means, said other tape extending first downwardly and then being threaded through a second curved guide device mounted on said carriage and then extending upwardly into connection with said actuator, whereby vertical movements of said selector are reflected by similar movements of said actuator.

7. In a voting machine, in combination,
a voting panel having a front face provided with a plurality of voting spaces arranged in horizontal rows and vertical columns,
a selector bar extending across the front face of said panel and movably mounted to sweep across all said voting spaces,
a network of vote registering counters disposed behind said panel and arranged in a pattern identical with that of said voting spaces so that one counter corresponds to each voting space,
an actuator guide disposed behind said panel and carried by said selector bar and parallel therewith for movement in unison with said selector bar to sweep across said counters as said actuator bar sweeps across said voting spaces,
a selector mounted for movement along said selector bar so that combined movement of said selector bar and said selector may position said selector at any one of said voting spaces,
an actuator mounted for movement along said actuator guide,
and means connecting said selector to said actuator for moving said actuator along said actuator guide as said selector is moved along said selector bar.

8. The voting machine as defined in claim 7 wherein said means is a flexible tape of curvilinear cross section.

9. In a voting machine, in combination,
a body defining an enclosure and having a panel provided with a plurality of voting spaces on its outer face,
a network of vote registering counters disposed within said body and arranged in a pattern identical with said voting spaces so that one counter corresponds to each voting space,
a vote selector,
first mounting means mounting said selector to sweep all of said voting spaces for selected registry with any one of said voting spaces,
a counter actuator within said body,
second mounting means mounting said actuator to sweep all of said counters for selected registry with any one of said counters,
means connecting said first and said second mounting means for movement in unison in one direction parallel to said panel,
and means connecting said selector and said actuator for movement in unison in a direction parallel to said panel but perpendicular to said one direction.

10. The voting machine as defined in claim 9 wherein the last means is a flexible tape of curvilinear cross section.

11. In a voting machine, in combination,
a body defining an enclosure and having a panel provided with a plurality of voting spaces on its outer face,
a network of vote registering counters disposed within said body and arranged in a pattern identical with said voting spaces so that one counter corresponds to each voting space,
a vote selector,
first mounting means mounting said selector to sweep all of said voting spaces for selected registry with any one of said voting spaces,
a counter actuator within said body,
second mounting means mounting said actuator to sweep all of said counters for selected registry with any one of said counters,
and means for moving said actuator in response to movement of said selector to register said actuator with that counter corresponding to the voting space at which said selector is positioned.

12. In a voting machine, in combination,
a panel having a plurality of voting spaces thereon arranged in at least three horizontal rows and at least three vertical columns,
a vote selector movably mounted for disposition in registry with any selected one of said voting spaces,
a network of vote registering counters remote from said voting spaces and arranged in a pattern identical with that of said voting spaces so that one counter corresponds to each voting space, an actuator movably mounted for disposition in registry with any selected one of said vote registering counters, and means for moving said actuator in response to movement of said selector to register said actuator with that vote registering counter corresponding to the voting space to which said selector is moved.

13. In a voting machine, in combination, a body having a voting panel having a front face provided with a plurality of voting spaces thereon arranged in at least three horizontal rows and at least three vertical columns, a vote selector mounted on said body for disposition is registry with any selected one of said voting spaces, a network of vote registering counters disposed within said body and arranged in a pattern identical with that of said voting spaces and in parallelism therewith so that one counter corresponds to each voting space, a counter actuator movably mounted within said body for disposition in registry with any selected one of said vote registering counters, and means connecting said selector to said actuator for slaving said actuator to said selector whereby said actuator is moved into registry with that counter corresponding to the voting space with which said selector may be registered.

References Cited by the Examiner

UNITED STATES PATENTS

| | | | |
|---|---|---|---|
| 1,058,723 | 4/1913 | Claypoole | 235—54 |
| 2,054,102 | 9/1936 | Shoup et al. | 235—55 |
| 2,600,144 | 6/1952 | Watson | 235—60 |

FOREIGN PATENTS 545,811  3/1932  Germany.

LEO SMILOW, *Primary Examiner.*

LEYLAND M. MARTIN, *Examiner.*